United States Patent Office 2,765,837
Patented Oct. 9, 1956

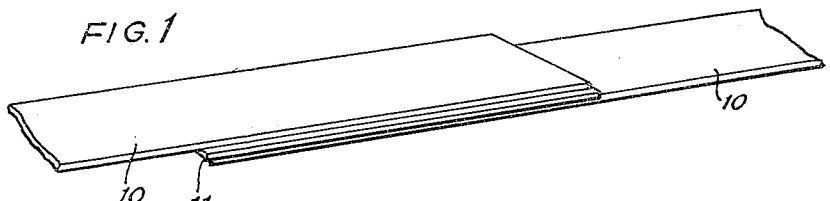
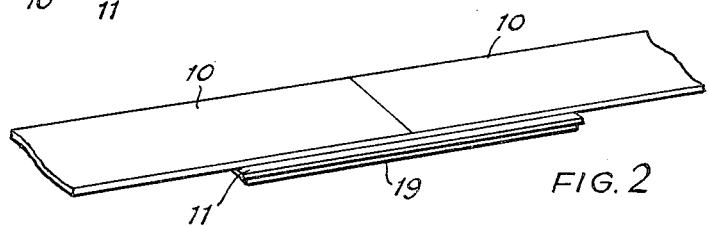
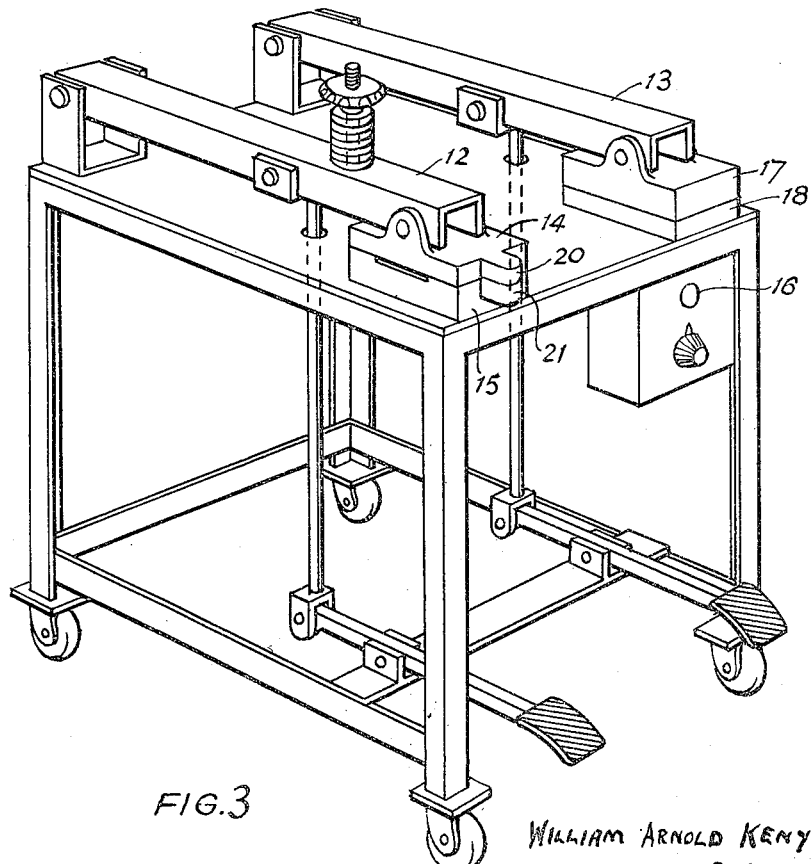

2,765,837

MACHINE FOR FORMING AN OVERLAPPING JOINT IN A BELT

William Arnold Kenyon, Woodley, England

Application July 29, 1953, Serial No. 371,021

Claims priority, application Great Britain August 1, 1952

1 Claim. (Cl. 154—1)

This invention concerns endless driving belts and is restricted to such driving belts made from tape consisting wholly or largely of a spun synthetic polyamide.

Hitherto, such endless driving belts, particularly for use in spinning and doubling frames, have largely been made from spun natural fibre material, such as cotton, although belts made from synthetic spun material have been used. In both cases, difficulty has been experienced in effecting an efficient joint and various methods of attachment have been tried. Attaching and securing by stitching and by various types of clip have chiefly been used, although various adhesives have also been tried. All prior methods of attachment, however, have suffered from one or more of a number of disadvantages. For instance, the joint has usually been the weakest part of the complete belt and distortion and lack of flexibility has been experienced in the area of attachment. In addition, the prior methods have taken a considerable amount of time to put into effect with consequent loss of productive efficiency.

The object of the present invention is to provide an improved method of forming an endless driving belt from a tape consisting wholly or largely of a spun synthetic polyamide, especially nylon, the method and the resultant belt overcoming the above disadvantages.

According to the present invention a method of forming an endless driving belt from a tape consisting wholly or largely of a spun synthetic polyamide, especially nylon, consists in forming a joint by overlapping, introducing between the adjacent layers of the overlap a strip of synthetic polyamide of the same or a similar nature to that of the tape but having a materially lower melting point and capable, on fusion of bonding therewith, and applying heat and pressure to the joint until the strip fuses to form a bond between the layers. This method of forming the belt can be carried out at a very high speed and can be easily performed on site.

The invention also includes a belt when made by such a method. Such a belt has been found to have the unexpected and highly desirable characteristic that it is strongest at the joint. Further, the joint has been found to be highly flexible and gives rise to no material distortion of the belt which could adversely effect its running efficiency. In addition, the belt has a long life and can be run at high speeds.

The invention also includes a machine for carrying out the above method including a thermostatically controlled heated press, having a visual signal adapted to indicate the desired period of press action, and a cold press.

The invention will be described further, by way of example, with reference to the accompanying drawings in which:

Fig. 1 shows one form of overlapped joint according to the invention,

Fig. 2 shows a second form of joint, and

Fig. 3 is a perspective view of a machine suitable for making the said joints.

In one practical application of the invention an endless driving belt 10 is formed from a length of spun polyamide tape, or a tape which is largely of spun polyamide but may include a small proportion of spun natural fibre material, such as cotton, of ¾ inch width. For effecting a bond there is provided a strip of polyamide 11, either cast or extruded, which is made from low melting polyamides commercially known by the generic term nylon. This strip is approximately 0.004 inch thick and of slightly greater width than the tape 10 to be bonded, and for normal purposes is about 2½ inches long.

For forming the joint a machine (see Fig. 3) having two pedal operated presses 12, 13 is provided. The platens 14, 15 of the first press 12 are electrically heated and thermostatically controlled, and a visual indicator 16 on the machine is adapted to give a signal after the expiration of the desired period of press operation. The press is arranged so that a pressure of several pounds weight can be applied to the material between the platens. The second pedal operated press 13 is smaller than the press 12, and can be applied to the material between its platens 17, 18.

The fusing temperature of the nylon strip 11 must be less than the temperature at which the nylon tape 10 would be substantially degraded. In the particular example being described the temperature at which the nylon strip 11 melts is approximately 180° C. whilst the temperature at which the nylon tape 10 would be substantially degraded when applied for the period required is over 230° C.

The first step in carrying out the method according to the invention is to prepare a joint by overlapping the two free ends of the length of tape 10 by about 3 inches and by placing the strip of nylon 11 between the overlapping ends, as shown in Fig. 1. The nylon strip 11 should protrude from the overlapping layers by about a millimetre at each end. A modified joint could serve equally well, for instance a joint formed by abutting the ends of the tape 10 and applying thereto a separate piece 19 of tape overlapping the abutting ends as shown in Fig. 2.

Holding the joint between the first finger and thumb of each hand it is then introduced between a pair of small extensions 20, 21 provided on the platens 14, 15 of the heated press 12 and the press is operated until the joint is tacked over a small area thereof, to prevent the layers moving on introduction beneath the platens proper of the heated press. The joint is then placed in position beneath the platens 14, 15 of the heated press, which wholly cover the joint, and the press operated. A suitable press temperature is about 200° C. Pressure is maintained for a suitable time which varies according to the heat transfer properties of the actual tape being used but which, in most cases, will lie between 30 and 80 seconds. In the example being described the period was 60 seconds. The visual indicator 16 will signal the expiration of the required period, whereupon the press platens 14, 15 are opened and the tape removed. It will be found that a bond of very high strength has been formed at the joint. It is then desirable immediately to introduce the newly formed joint between the platens 17, 18 of the cold press 13 and to apply pressure for a few seconds thereto.

The thickness of the joint is initially equal to twice the thickness of the tape 10 but after use this is found to be reduced, particularly at the ends of the joint.

The operative life of a tape made according to the example described is thought to be many times that of old types of belts and at least twice that of a similar nylon belt joined in the conventional manner of stitching or clipping. It is also thought, due to the smoother running and greater flexibility of the joint that an increase of from 1% to 6% in spinning and doubling efficiency will be achieved, together with a much greater regularity of twist, greatly increasing the quality of the yarns being spun or doubled.

I claim:

In a machine for forming an overlapping joint in a belt by fusing plastic material at the joint, the combination of a pair of opposed heated platens of a width adapted to receive the entire overlapped ends of the belt at the joint, said platens having forwardly protruding opposed portions of lesser width than the overlap, and means for controlling the opening and closing of said platens.

References Cited in the file of this patent

UNITED STATES PATENTS

| | | |
|---|---|---|
| 1,899,067 | Trumbull | Feb. 28, 1933 |
| 2,220,545 | Reinhardt | Nov. 5, 1940 |
| 2,469,972 | Lowry et al. | May 10, 1949 |
| 2,534,325 | Way | Dec. 19, 1950 |
| 2,647,554 | Grieshammer | Aug. 4, 1953 |
| 2,661,787 | Keller | Dec. 8, 1953 |
| 2,694,436 | Pettit | Nov. 16, 1954 |